May 16, 1967     A. K. BEY     3,320,445
RECIPROCATING MOTOR WITH MOTION CONVERSION MEANS
Filed Nov. 30, 1964
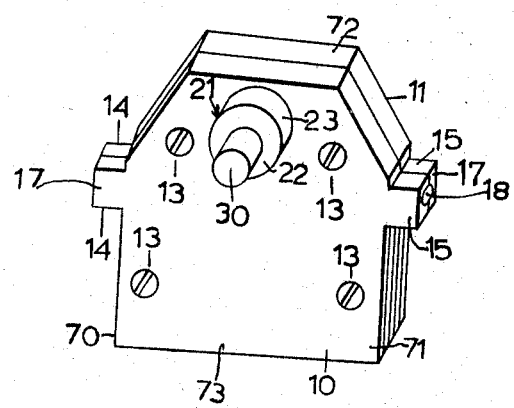
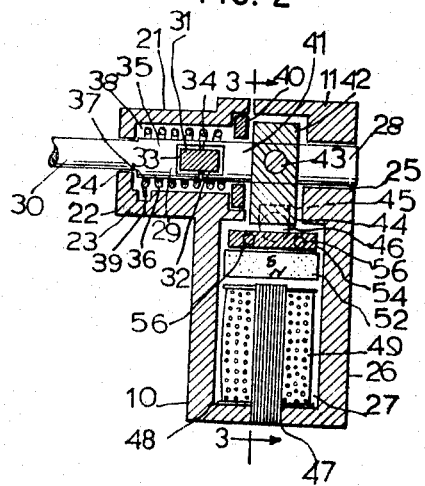
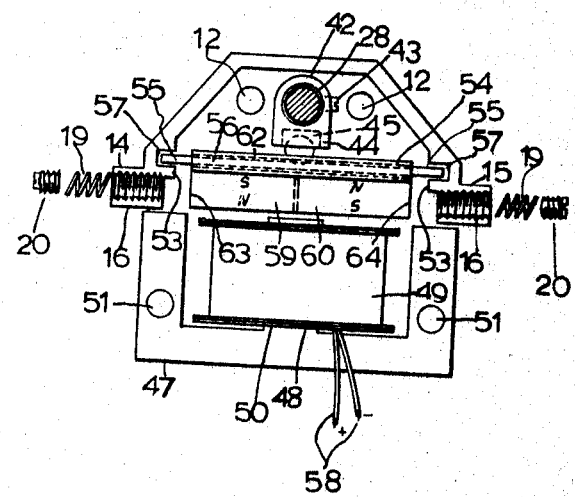
INVENTOR.
Ahmet. K. Bey United States Patent Office 3,320,445
Patented May 16, 1967

3,320,445
RECIPROCATING MOTOR WITH MOTION
CONVERSION MEANS
Ahmet K. Bey, 2508 S. Kedzie Ave.,
Chicago, Ill. 60623
Filed Nov. 30, 1964, Ser. No. 414,802
13 Claims. (Cl. 310—20)

The instant invention relates to motors. Particularly the invention relates to an alternating current motor.

The motors which have been designed in accordance with the instant invention are small motors adapted to produce high torque at relatively low speeds. Small motors are especially useful in small appliances adapted for home use, such as rotisseries, can openers and the like. They also are employed in the operation of automatic equipment, on automobiles, for example, such as mechanisms for automatically winding and unwinding windows. However, notwithstanding its adaptability in the already highly developed small motors art, this invention is not limited to small motors.

With respect to small motors or motors to be used in appliances or to operate devices of the character heretofore indicated, cost is an exceedingly important factor. That is to say, for motors having characteristics of and capable of performing within defined or specified standards, a cost factor of as little as a few pennies will determine whether or not a small motor will be commercially acceptable. Moreover, cost is of such substantial significance that improvements and advancements in the art which increase cost which cannot be otherwise offset rarely become introduced or gain widespread employment in industry, even though only pennies per motor unit may be involved.

In accordance with one of the features of the instant invention and as an object thereof, there is provided an improved motor. The improved motor is characterized in that it is capable of being constructed at a cost which is substantially below that of conventional motors of the same size and class.

Furthermore, and as an additional object of the invention, there is provided a variable speed motor which is characterized by slow speed and uniform load bearing high torque within its range of speeds.

In my co-pending applications Ser. No. 395,100, filed Sept. 8, 1964, now abandoned, and Ser. No. 398,347, filed Sept. 22, 1964, there are defined and taught varying means for translating an oscillating or rocking mechanical input force into a single directional mechanical output torque. The instant invention has been adapted to be used in conjunction with the teachings of said co-pending applications. That is, novel means are provided for producing required oscillating force from an alternating current. However, it is not intended that the scope of this invention be limited to use in motors employing the teachings of said prior applications.

To that end, and as a further object of the instant invention, there is provided in a motor novel means for converting alternating electrical energy into a mechanical force adapted to actuate a motor shaft.

It is additionally an object of the instant invention to provide novel means in a motor for translating an alternating electric current into a mechanical force having a reciprocative vector in a path of alternating direction.

It is still a further object of the instant invention to provide a motor in which electrical energy is converted into a mechanical force of alternating direction in a straight path with means for translating the force into a torque for rotation of an output motor shaft.

It is an additional object of the instant invention to provide an alternating current motor having an electromagnet with a permanent magnet mounted adjacent said electro-magnet, means for defining the motion of the permanent magnet in an alternating straight path, a shaft rocker rigidly secured to the permanent magnet to cause a rocking or oscillating torque to be applied to the motor shaft and means for intermittently clutching the shaft to permit rotation only in a single direction.

The foregoing and other objects, features and advantages of the present invention will become more apparent upon consideration of the following description and appended claims, when considered in conjunction with the accompanying drawings wherein the same reference character or numeral refers to like or corresponding parts throughout the several views.

On the drawings:

FIG. 1 is a perspective view of one embodiment of the present invention.

FIG. 2 is a vertical sectional view of said embodiment.

FIG. 3 is a view of said embodiment with only one cover taken substantially on the line 3—3 of FIG. 1 and looking in the direction of the arrows, parts being exploded laterally for the purpose of illustration.

Referring now more particularly to the drawings, it is seen that the motor comprises a housing having a pair of housing members or covers 10 and 11 defining therebetween a chamber 27 and having a plurality of aligned apertures 12. By means of fasteners such as screws or the like 13 which are illustrated in FIG. 3 and which are extended through the aligned apertures 12, the housing members 10 and 11 are secured together. In this description, housing member 10 shall be considered the "front" and housing member 11 shall be considered "back" or "rear."

Each of the housing members 10 and 11 has a pair of aligned shoulders 14 and 15 which extend outwardly from opposite housing sides 70 and 71, being disposed about midway between the top 72 and bottom 73 of said housing. Said shoulders 14 and 15 are provided with inwardly facing laterally extending threaded grooves 16, respectively, as illustrated in FIG. 2. The shoulders 14 of the housing members 10 and 11 are operably alignable, as are the shoulder extensions 15, to provide a pair of aligned housing extensions 17 having therein a pair of threaded bores 18, respectively, as well illustrated in FIG. 3. As illustrated in FIG. 2, a small compression spring 19 is adapted to be mounted in each bore 18, and a screw 20 is adapted to be threaded in each bore 18 in bearing relationship with an associated spring 19 to adjust its tension for a purpose that will become apparent hereinafter. Springs 19 and screws 20 are shown in FIG. 2 exploded outwardly for the purpose of illustration.

The housing member 10 has a forwardly projected extension 21 defined by a front end face 22 and an annular wall 23 which define therein an extension 38 of chamber 27. The front end face 22 has an aperture 24 which is in co-axial alignment with and may be of smaller radius than a rear aperture 25 which is formed in the rear wall 26 of the housing or cover member 11.

A shaft input section 28 is disposed within the chamber 27 with its rear end portion journalled in the aperture 25. A shaft output section 29 is disposed within the chamber section 38 in co-axial alignment with the shaft input section 28. The output section 29 has a reduced outer end portion 30 journalled in the aperture 24 through which the output section 29 is projected outwardly from housing or cover member 10, as illustrated in FIGS. 1 and 3.

A well 31 is provided in the inner end portion of the output section 29. A well 32 is provided in the inner end portion of the input section 28. Wells 31 and 32 are centrally disposed with respect to their respective shafts, and said wells are in co-axial alignment with each other. A tie, pin or rod 33, the external diameter of which is substantially the same as, though slightly smaller than, the diameter of the wells 31 and 32, has its opposite end portions disposed in said wells 31 and 32, respectively. Thereby, the input section 28 and the output section 29 are connected together in co-axial alignment.

A coiled torsion spring 34 which serves to connect the shaft sections 28 and 29 is mounted or disposed about the inner portions of the shaft sections 28 and 29. The radius of curvature of the loops of torsion spring 34 is substantially the same as but preferably slightly less than the radius of curvature of the shaft section 28 and the larger or inner portion 35 of shaft section 29.

A coiled torsion spring 36 is mounted or disposed about that part 37 of shaft portion 35 which is disposed adjacent the aperture 24. The first coil of the spring 36 adjacent the end wall 22 may have a lug 39 which anchors the outer or front end of the spring 36 in the housing member 10. The radius of curvature of the loops or coils of the spring 36 is substantially the same as but preferably slightly smaller than the radius of curvature of shaft portion 37 about which said spring 36 is mounted.

In the illustrated embodiment, the torsion spring 36 comprises only the first pair of loops appearing to the left in FIG. 1, while the torsion spring 34 comprises all of the loops to the right of the torsion spring 36 in FIG. 1. Furthermore, the torsion springs 34 and 36 are coiled or turned in opposite directions; that is to say, one of the torsion springs must be coiled or turned in one direction, and the other of said torsion springs must be coiled or turned in another or opposite direction. The reason for the foregoing arrangement of parts is set forth with particularity in my aforesaid application Serial No. 395,100.

If desired, the shaft comprising the input and output shaft sections 28 and 29 may be supported medially by means of a bearing member such as a washer 40 or the like in which a portion 41 of the shaft beyond the torsion spring 34 is journalled. The washer 40 may be mounted within the housing in any suitable fashion to provide the desired bearing support.

The device is provided with means for rocking the input shaft section 28. In the form of the invention illustrated, said means include an apertured block 42 through which the shaft input section 28 extends and in which it is secured by means such as a set screw 43 which is threaded through the block 42 and bears against the shaft input section 28, as illustrated in FIGS. 1 and 2. In its lower end portion 44 and below the shaft input section 28, the block 42 has a downwardly opening pocket, or opening 45 the wall of which is curved on a radius to provide a centrally disposed seat for a ball 46 which acts as a shaft rocker, as will become apparent hereinafter.

As illustrated in the drawings, a conventional E-shaped laminations member 47 is rigidly secured between lower end portions of housing members 10 and 11 and may be considered as a part of the base of the motor. The laminations member 47 is provided with apertures 51, as illustrated in FIG. 2, through which the lower screws or fasteners 13 are extendable to secure the opposite housing members 10 and 11 together on opposite front and rear faces of the laminations member 47. A conventional coil comprising reel 48 wound with wire 49 is disposed about the upwardly extending center arm 50 of said laminations member 47.

A permanent magnet 52 is mounted within chamber 27 and above the coil wound reel 48. Said magnet 52 is disposed between block 42 and reel 48 and medially of the side extensions or arms 17, being spaced from the inner walls 53 defining the inner limits of said arms or extensions 17.

The lower face of a slab or plate 54 which is fabricated from a magnetic material such as soft steel is rigidly secured to the top face of the permanent magnet 52 by means such as cement, the character of which is known to those skilled in the art. Preferably, the area of the plate or slab 54 is substantially the same as that of the magnet 52, whereby their adjoining faces are co-extensive.

The plate or slab 54 has a pair of side extensions or lugs 55 which, in the form of the invention illustrated in the drawings, are outwardly extending portions of a pair of parallel pipes or bars 56 which extend laterally through opposite sides of the plate 54 in which said pipes are secured. The lugs 55 are disposed in inwardly opening opposed recesses 57 which are formed in spaced apart and transversely aligned relationship in the inner surfaces 53 above the extensions 17, as illustrated in FIG. 2. By reason of the foregoing disposition of the lugs 55, rocking movement, that is, movement about an axis of rotation, by magnet 52 is precluded. Nevertheless, the magnet 52 is able to move or oscillate in a flat plane. That is to say, it is able to vibrate or reciprocate in the direction of an alternating vector, the path of which is determined by the position of the recesses 57 in which the movement of the lugs 5 is guided and limited, as illustrated in FIG. 2.

The permanent magnet 52 is polarized from side to side. For example, in the embodiment illustrated as in FIG. 2, a South Polar area is at the left of the magnet 52 and a corresponding North Polar area is at the right. Such polar areas, as well as others to be defined hereinafter, are labeled with conventional "S" and "N" symbols. Accordingly, plate 54 serves as a magnetic field reinforcing member which enhances the magnetic field induced upon energization of coil 49; and, while said plate 54 is not essential to the operation of the motor, better output torque is obtained by reason of its employment.

The performance of the motor may be further substantially enhanced by additionally polarizing each side of the magnet 52 vertically. That is to say, the left half 59 of the magnet 52 has an upper portion which is polarized South, as heretofore described, while a lower portion thereof may be polarized North. Moreover, the right half 60 of the magnet 52 has an upper portion which is polarized North, as heretofore described, whereas its lower portion may be polarized South. Thereby, the magnet 52, in addition to being polarized from side to side, may be polarized from top to bottom accordingly creating four polar areas, as illustrated in FIGS. 1 and 2.

An upwardly opening shallow recess is centrally disposed in the top or upper surface 62 of the magnetizable plate 54. The lower end portion of shaft rocker 46 is rigidly secured in such recess by any suitable means such as cementing or welding, and its upper portion is projected upwardly from said upper surface 62 into the pocket or seat 45. In the embodiment of the invention shown, the shaft rocker 46 is in the form of a ball or sphere substantially half of which is disposed within the recess or pocket 45 the diameter of which may be slightly larger than the diameter of the ball or sphere. Accordingly, the shaft rocker 46 vibrates or reciprocates along a lineal vector having an alternating direction together with the plate 54 and magnet 52, the force of movement of which said shaft rocker 46 is adapted to transmit to the block 42.

The width of the magnet 52 is somewhat less than the width of that portion of the chamber 27 in which said magnet is disposed, with the opposite sides 63 and 64 of said magnet 52 being spaced from the inner surfaces 53 of said housing. Thereby, the magnet is free to vibrate from side to side. The latitude of the vibrations of the magnet 52 from side to side is adapted to be limited by the springs 19 which are adjustably disposed against the sides 63 and 64 of said magnet.

Now, the manner in which the device operates is as follows: The coil 49 is energized by introducing an alternating current through circuit wires 58 to thereby induce a magnetic field of alternating polarity. The magnet 52 accordingly will vibrate, oscillate or move from side to side in an alternating straight path in response to alternation of the magnetic field. The latitude of the oscillations or vibrations is limitable by the compression springs 19, the pressure of which is adjustable by adjusting the screws 20. Accordingly, the speed of the oscillations or vibrations, that is, the frequency thereof, can be adjusted, whereby the motor is of variable speed. The reciprocative motion, vibration or oscillation of the magnet 52 may be verbally characterized as being the result of conversion of an alternating electrical current into an alternating mechanical force having a vector in an alternating direction. The alternating, vibrating or oscillating magnet 52 together with its plate 54 cause shaft rocker 46 also to vibrate correspondingly and within the pocket 45 of the block 42 to cause said block to rock from side to side about the axis of rotation of the shaft sections 28 and 29.

As the block 42 rocks back and forth, the shaft input section 28 will rock back and forth, correspondingly, to cause the output shaft section 29 to rotate in a series of disconnected single directional or partial rotations in accordance with the teachings of my said application Ser. No. 395,100. That is to say, as the shaft section 28 rocks in one direction, for example clockwise with respect to FIG. 2, the spring 34 by reason of the direction of the turns thereof will tighten on said section 28 and also upon the shaft section 29 to cause the shaft section 29 to rock with the shaft section 28. As the shaft section 28 then rocks in an opposite direction, counterclockwise, the spring 34 will release its grip on both shaft sections 28 and 29 by reason of the direction of its winding. However, the windings of the spring 36 are turned in a direction opposite to the direction of the turns of the spring 34, and accordingly when the spring 34 is loose the spring 36 will tighten. Inasmuch as the spring 36, however, is disposed only about the shaft section 29, its tightening will be only on said shaft section 29. Therefore, when the spring 34 is loose as the shaft section 28 rocks counterclockwise, the spring 36 is tight on the shaft section 29 and will clutch said shaft section 29 and not permit it to rotate counterclockwise with the shaft section 28. Accordingly, while the shaft section 28 is able to rock clockwise and counterclockwise, the shaft section 29 can rock only clockwise and will be restrained from counterclockwise rotation. Thereby, a rocking input motion is converted into a single directional force at the output end 30 of the shaft section 29.

From the foregoing, it is appreciated that, first, alternating electrical energy is translated into an alternating, vibrating or oscillating mechanical force having an alternating vector, that is, a mechanical force moving in an alternating straight path, and that in turn the straight force is translated into a pendulous, vibrating or oscillating torque which in turn is translated or converted into the single directional output force of a motor.

As many substitutions or changes could be made in the above described construction, and as many apparently widely different embodiments of the invention within the scope of the claims could be constructed without departing from the scope and spirit thereof, it is intended that all matter contained in the accompanying specification shall be interpreted as being illustrative and not in a limiting sense.

What is claimed is:

1. In an alternating current motor, the combination of means providing a housing, a motor shaft having an output section journalled in said housing, translation means for changing mechanical input oscillations into a single directional output torque, means for applying output torque on said output section and electro-magnetic means including a current input mechanism for inducing an alternating magnetic field with magnetic means arranged for movement in an alternating lineal path a uniform distance from said motor shaft in the induced magnetic field for providing and applying to the translation means a mechanical force.

2. An alternating current motor as defined in claim 1 in which the magnetic means is a permanent magnet polarized transversely of the longitudinal axis of said motor shaft.

3. An electric motor having a housing, a motor shaft journalled in said housing, electro-magnetic means disposed in said housing for inducing a magnetic field in said housing, magnetic means spaced from said electro-magnetic means and disposed in the thereby induced magnetic field, said magnetic means for converting electromagnetic energy to motion, means for applying the force of the motion as a single directional torque on said shaft, said magnetic means characterized by a permanent magnet polarized transversely of said shaft and movable upon electrical excitation of said electro-magnetic means, and means for limiting the movement of said permanent magnet in a substantially straight path.

4. The motor defined in claim 3 in which said permanent magnet has two additional polar areas.

5. The motor defined in claim 4 in which the polarization of said magnet provides for each polar area a pair of poles of opposite polarity and disposed at right angles to such polar area.

6. The motor defined in claim 4 in which each polar area is at right angles to a pair of other polar areas of opposite polarity.

7. The motor defined in claim 3 characterized by a plate of magnetic material secured to the top of said magnet.

8. The device defined in claim 3 in which the means for limiting the movement of said magnet in a straight path comprises a boss extending outwardly from said permanent magnet and fixed means defining the movement of said boss.

9. The device defined in claim 8 in which said fixed means comprise said housing having therein a recess, said boss disposed in said recess, whereupon excitation of the electro-magnetic means the permanent magnet will move in a path defined by said recess.

10. The device defined in claim 3 in which the means for limiting the movement of said magnet in a straight path comprises a pair of bosses aligned transversely of said shaft and extending outwardly from said shaft, said housing having a pair of spaced apart recesses aligned transversely of said shaft, said bosses disposed in said recesses, whereby upon energization of said electromagnet said permanent magnet will move in a straight path in alternating directions.

11. For use in an alternating current electric motor having an output shaft, electro-magnetic means for inducing a magnetic field and means for translating an input oscillating torque to a single directional torque applied on said output shaft, a motor housing having a pair of spaced apart apertures aligned transversely of said shaft; a permanent magnet disposed within said housing and spaced therefrom between said apertures; a pair of bosses disposed and movable in said apertures, a rocker rigidly secured to said permanent magnet, and a rockable member engaged by said rocker and adapted to provide an oscillating input torque, said magnet polarized transversely of said shaft, whereupon energization of said electro-magnetic means said permanent magnet will vibrate in a path having a vector alternating in direction to oscillate said rocker member.

12. An alternating current motor comprising a housing; a shaft journalled in an upper portion of said housing; an electro-magnet disposed in a lower portion of said housing; a permanent magnet disposed above and in the magnetic field of said electro-magnet, said housing having a pair of recesses disposed in alignment transversely of said shaft, said permanent magnet polarized in the direction of said recesses; a pair of guides carried on said permanent magnet and disposed in said recesses, said recesses being slightly larger than said guides; an upwardly extending shaft rocker rigidly connected to said permanent magnet, an oscillator rockable about the axis of rotation of said shaft and engaging said shaft rocker, and means for applying one phase of the motion of said oscillator to said shaft, whereby the energy of an alternating electric current is transformed to a force moving in an alternating straight path by said magnet and to an oscillating torque by said rocker and said oscillator.

13. An alternating current motor comprising a housing; a shaft having input and output sections journalled in an upper portion of said housing; an electro-magnet disposed in the lower portion of said housing, said housing having a pair of spaced apart recesses disposed in alignment transversely of said shaft; a permanent magnet disposed in said housing between and polarized in the direction of said recesses, said permanent magnet being spaced above said electro-magnet in the thereof induced magnetic field; a pair of guides carried on said permanent magnet and disposed in said recesses, said recesses being slightly larger than said guides, whereby said permanent magnet when energized moves in a straight path in alternating directions transversely of said shaft; an upwardly extending shaft rocker rigidly connected to said magnet; an oscillator secured to said shaft input section and engaging said shaft rocker, whereby the alternating lineal movement of the permanent magnet is converted to an oscillating torque, and means for intermittently clutching the output portion of said shaft to limit its rotation to a single direcion.

References Cited by the Examiner

UNITED STATES PATENTS

| | | | |
|---|---|---|---|
| 2,096,458 | 10/1937 | Johnson | 310—37 |
| 3,052,828 | 9/1962 | Phinizy. | |
| 3,124,009 | 3/1964 | Grover | 74—126 X |
| 3,156,125 | 11/1964 | Straub | 74—126 |

MILTON O. HIRSHFIELD, *Primary Examiner.*

D. F. DUGGAN, *Assistant Examiner.*